United States Patent
Gupta et al.

(10) Patent No.: US 11,210,237 B2
(45) Date of Patent: Dec. 28, 2021

(54) INTEGRATION OF APPLICATION INDICATED MINIMUM AND MAXIMUM TIME TO CACHE FOR A TWO-TIERED CACHE MANAGEMENT MECHANISM

(71) Applicant: INTERNATIONAL BUSINESS MACHINES CORPORATION, Armonk, NY (US)

(72) Inventors: Lokesh Mohan Gupta, Tucson, AZ (US); Kyler A. Anderson, Sahuarita, AZ (US); Beth Ann Peterson, Tucson, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 16/790,249

(22) Filed: Feb. 13, 2020

(65) Prior Publication Data
US 2021/0255967 A1    Aug. 19, 2021

(51) Int. Cl.
*G06F 12/128* (2016.01)
*G06F 12/123* (2016.01)
*G06F 12/0866* (2016.01)

(52) U.S. Cl.
CPC ........ *G06F 12/128* (2013.01); *G06F 12/0866* (2013.01); *G06F 12/124* (2013.01); *G06F 2212/225* (2013.01); *G06F 2212/283* (2013.01); *G06F 2212/305* (2013.01)

(58) Field of Classification Search
None
See application file for complete search history.

(56) References Cited

U.S. PATENT DOCUMENTS

| | | | |
|---|---|---|---|
| 5,513,336 A | 4/1996 | Vishlitzky et al. | |
| 8,423,715 B2 | 4/2013 | Heil et al. | |
| 8,533,393 B1 * | 9/2013 | Cote | G06F 12/0804 |
| | | | 711/118 |
| 9,390,116 B1 | 7/2016 | Li et al. | |
| 9,529,731 B1 | 12/2016 | Wallace et al. | |
| 9,946,657 B1 * | 4/2018 | Muthukkaruppan | |
| | | | G06F 12/0868 |
| 10,067,883 B2 | 9/2018 | Ash et al. | |
| 10,270,879 B1 | 4/2019 | Wallner et al. | |

(Continued)

OTHER PUBLICATIONS

Gaur et al. "Bypass and Insertion Algorithms for Exclusive Last-level Caches." Jun. 2011. ACM. ISCA '11. pp 81-92. (Year: 2011).*

(Continued)

*Primary Examiner* — Nathan Sadler
(74) *Attorney, Agent, or Firm* — Konrad Raynes Davda & Victor LLP; Rabindranath Dutta

(57) ABSTRACT

Indications of a minimum retention time and a maximum retention time in a cache comprising a first type of memory and a second type of memory are received from a host application for a first plurality of tracks, wherein the minimum retention time or the maximum retention time are not indicated for a second plurality of tracks. In response to accessing a track of the first plurality of tracks, the minimum retention time is set for the track for the first type of memory, and the maximum retention time is set for the track for the second type of memory.

20 Claims, 17 Drawing Sheets

(56) References Cited

U.S. PATENT DOCUMENTS

| | | | | |
|---|---|---|---|---|
| 2008/0046655 | A1* | 2/2008 | Bhanoo | H04L 67/28 |
| | | | | 711/133 |
| 2009/0037660 | A1* | 2/2009 | Fairhurst | G06F 12/126 |
| | | | | 711/129 |
| 2014/0067852 | A1* | 3/2014 | Wong | G06F 16/24552 |
| | | | | 707/769 |
| 2014/0330817 | A1* | 11/2014 | Eleftheriou | G06F 3/0686 |
| | | | | 707/722 |
| 2015/0039837 | A1 | 2/2015 | Quan et al. | |
| 2016/0378601 | A1 | 12/2016 | Oukid et al. | |
| 2017/0052898 | A1* | 2/2017 | Ash | G06F 12/0893 |
| 2018/0067660 | A1 | 3/2018 | Yamamoto | |
| 2018/0300257 | A1 | 10/2018 | Ash et al. | |
| 2019/0391923 | A1 | 12/2019 | Gupta et al. | |
| 2019/0391930 | A1 | 12/2019 | Gupta et al. | |
| 2019/0391931 | A1 | 12/2019 | Gupta et al. | |
| 2019/0391932 | A1 | 12/2019 | Gupta et al. | |
| 2019/0391933 | A1 | 12/2019 | Gupta et al. | |
| 2021/0255964 | A1* | 8/2021 | Gupta | G06F 12/0893 |
| 2021/0255965 | A1* | 8/2021 | Gupta | G06F 12/124 |

OTHER PUBLICATIONS

Hsieh et al. "Double Circular Caching Scheme for DRAM/PRAM Hybrid Cache." Aug. 2012. IEEE. 2012 IEEE International Conference on Embedded and Real-Time Computing Systems and Applications. pp 469-472. (Year: 2012).*

U.S. Appl. No. 16/790,226, filed Feb. 13, 2020.

U.S. Appl. No. 16/790,310, filed Feb. 13, 2020.

List of IBM Patents and Applications Treated and Related, dated Feb. 13, 2020, pp. 2.

Notice of Allowance dated May 10, 2021, pp. 14, for U.S. Appl. No. 16/790,226.

D.Ustiugov, et al., "Design Guidelines for High Performance SCM Hierarchies", International Symposium on Memory Systems (MEMSYS) Oct. 2018, pp. 16.

Notice of Allowance dated Jun. 30, 2021, pp. 24, for U.S. Appl. No. 16/790,310.

IEEE Search Results (Year: 2021) in the notice of references (PTO-892) attached to the Notice of Allowance dated Jun. 30, 2021 pp. 24, for U.S. Appl. No. 16/790,310.

\* cited by examiner

INTEGRATION OF APPLICATION INDICATED MINIMUM AND MAXIMUM TIME TO CACHE FOR A TWO-TIERED CACHE MANAGEMENT MECHANISM

BACKGROUND

1. Field

Embodiments relate to the integration of application indicated minimum and maximum time to cache for a two-tiered cache management mechanism.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual-server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device. In computing, cache replacement policies are used to determine which items to discard (i.e., demote) from the cache to make room for new items in the cache. In a least recently used (LRU) cache replacement policy, the least recently used items are discarded first.

A storage class memory (SCM) is non-volatile memory that provides access speeds much higher than solid state drives (SSD). SCM is much cheaper than DRAM, but has a latency of a few microseconds which is higher than the latency of DRAM, where the latency of DRAM is of the order of nanoseconds. However, the latency of SCM is much lower than the latency of SSDs, where the latency of SSDs is generally greater than 100 microseconds. SCM may be comprised of non-volatile memory NAND devices that may be referred to as Flash memory. SCM may be comprised of other types of devices besides NAND devices.

In situations where SCM uses Flash memory for non-volatile storage, SCM exhibits some of the same limitations as SSDs. Flash memory devices have less endurance than DRAM as there are a limited number of erase cycles for flash bit cells, far less so than for DRAM cells. Wear leveling techniques that distribute writes across multiple flash memory cells in the same or different devices may be used to avoid overuse of specific Flash memory cells. Additionally, garbage collection may be time consuming with Flash memory based devices. There are many pages in an erase block. Since writes to Flash memory is done in pages but reclaiming is done on erase blocks level, it may lead to fragmentation and hence garbage collection may become processor intensive over time for SCM. It should be noted that generally SCMs have less write endurance and slower access characteristics than DRAM, but while many SCMs use Flash memory, not all do.

SUMMARY OF THE PREFERRED EMBODIMENT

Provided are a method, system, and computer program product in which indications of a minimum retention time and a maximum retention time in a cache comprising a first type of memory and a second type of memory are received from a host application for a first plurality of tracks, wherein the minimum retention time or the maximum retention time are not indicated for a second plurality of tracks. In response to accessing a track of the first plurality of tracks, the minimum retention time is set for the track for the first type of memory, and the maximum retention time is set for the track for the second type of memory.

In certain embodiments, the first type of memory has a lower latency and a lower storage capacity than the second type of memory.

In further embodiments, the first type of memory is a dynamic random access memory (DRAM) cache and the second type of memory is a storage class memory (SCM) cache.

In yet further embodiments, a cache management application attempts to maintain the track in the DRAM cache for at least a first amount of time that equals the minimum retention time, and attempts to maintain the track in the SCM cache for no more than a second amount of time that equals the maximum retention time.

In certain embodiments, an insertion point of the track in a first least recently used (LRU) list of the SCM cache for the track is determined based on the maximum retention time that the track is allowed to be retained in the SCM cache, wherein different insertion points in the first LRU list of the SCM cache correspond to different amounts of time that a selected track of the first plurality of tracks is expected to be retained in the SCM cache.

In further embodiments, the DRAM cache and the SCM cache form a two-tiered cache with the DRAM cache being a higher tier and the SCM cache being a lower tier, and wherein tracks are promoted to the SCM cache from the DRAM cache in response to determining that a read access time exceeds a first predetermined threshold and a write access time is below a second predetermined threshold.

In certain embodiments, tracks of the second plurality of tracks undergo a default mechanism for demotion from the cache.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A storage controller may include a two-tiered cache in which a first tier of the cache is a Dynamic Random Access Memory (DRAM) cache and a second tier of the cache is a storage class memory (SCM) cache. The storage capacity of the DRAM cache is relatively smaller in comparison to the storage capacity of the SCM cache. However, the latency of the DRAM cache is relatively lower than the latency of the SCM cache. There is a need in the art for improved techniques for managing a two-tiered cache that includes DRAM and SCM.

In a conventional least recently used (LRU) based cache management mechanism of a storage controller, a cache management application may add a track to the most recently used (MRU) end of a least recently used (LRU) list of tracks. The cache management application demotes a track from the cache, in response to determining that the track is a least recently used (LRU) track in a LRU list of tracks.

An application may provide indications (i.e., hints) to the cache management application of the minimum amount of time that a track should remain in the cache, where the application is aware that the track is likely to access the track once again within the minimum amount of time. The minimum amount of time is referred to as the minimum retention time.

The application may additionally provide indications (i.e., hints) to the cache management application of the maximum amount of time that a track should remain in the cache, where the application is aware that the track is unlikely to access the track after the indicated maximum amount of time. The maximum amount of time is referred to as the maximum retention time.

In certain embodiments, caching applications in a storage controller with a two-tiered cache takes account of hints provided by the host application to retain certain tracks in the DRAM cache for at least the indicated minimum amount of time, and in the SCM cache for no more than the indicated maximum amount of time.

Certain embodiments provide improvements to computer technology, by integrating application indicated minimum and maximum retention time for tracks to LRU based track demoting schemes in a cache management system of a storage controller with a two-tiered cache. As a result, caching operations in a storage controller with a two-tiered cache takes account of hints (i.e., indications) provided by an application to retain certain tracks in cache for at least a minimum amount in time and not retain certain tracks in cache beyond a maximum amount of time.

Exemplary Embodiments

Figure 1:
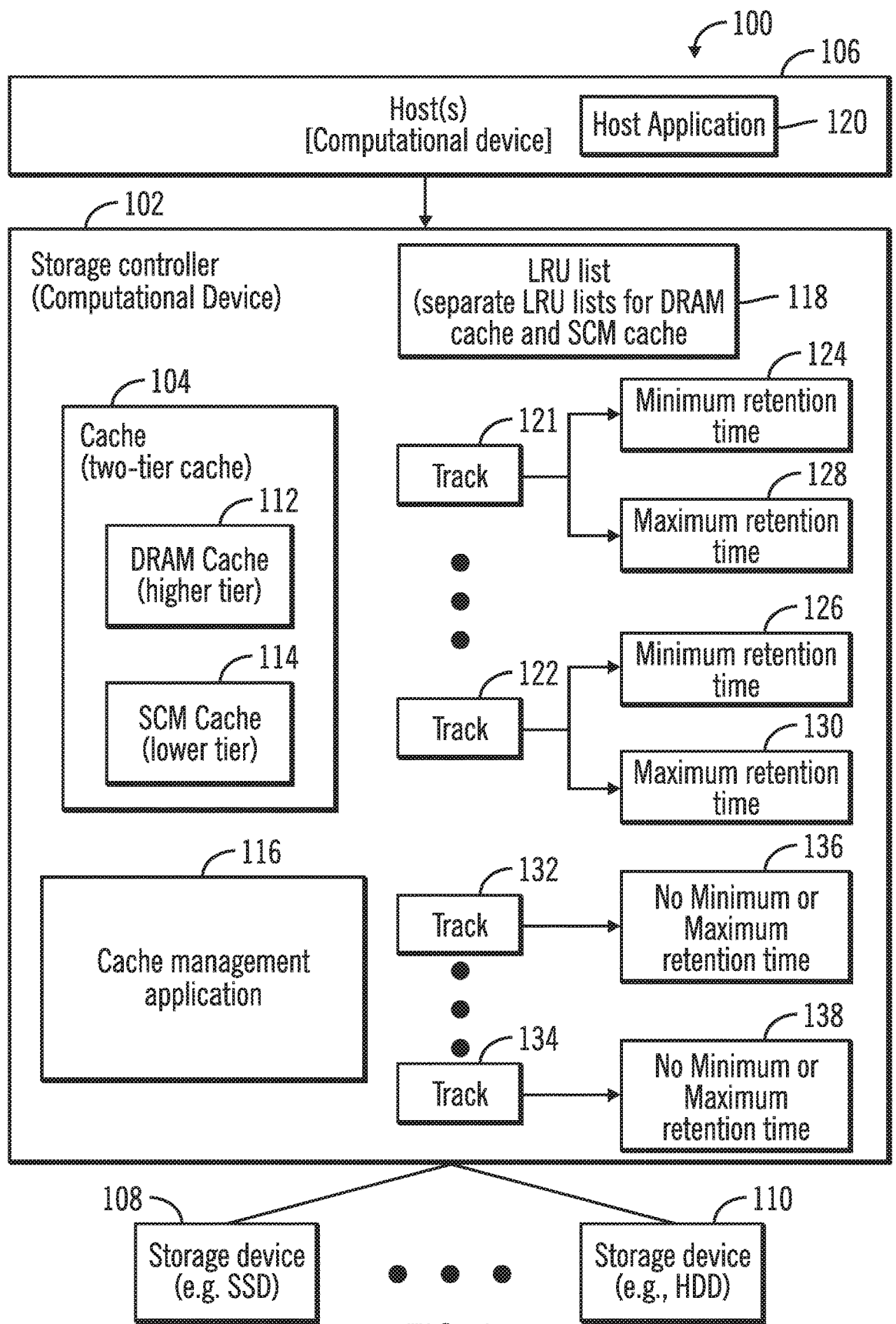
FIG. 1 illustrates a block diagram of a computing environment comprising a storage controller with a two-tiered cache coupled to one or more hosts and one or more storage devices, in accordance with certain embodiments.

FIG. 1 illustrates a block diagram of a computing environment 100 comprising a storage controller 102 with a two-tiered cache 104 coupled to one or more hosts 106 and one or more storage devices 108, 110, in accordance with certain embodiments.

The storage controller 102 allows the one or more hosts 106 to perform input/output (I/O) operations with logical storage maintained by the storage controller 102. The physical storage corresponding to the logical storage may be found in one or more of the storage devices 108, 110 and/or cache 104 (also referred to as a two-tiered or two-tier cache) of the storage controller 102.

The storage controller 102 and the hosts 106 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores.

The storage controller 102 and the one or more hosts 106 may be elements in any suitable network, such as, a storage area network, a wide area network, the Internet, an intranet. In certain embodiments, storage controller 102 and the one or more hosts 106 may be elements in a cloud computing environment.

The two-tiered cache 104 may be any suitable cache known in the art or developed in the future. In some embodiments, the two-tiered cache 104 may be implemented with a volatile memory (such as the DRAM cache 112) and a non-volatile memory (such as the SCM cache 114). The two-tiered cache 104 may store both modified and unmodified data, where a cache management application 116 may periodically demote (i.e., move) data from the SCM cache 114 to storage devices 108, 110 controlled by the storage controller 102. In certain embodiments, the cache management application 116 may be implemented in software, firmware, hardware or any combination thereof.

The plurality of storage devices 108, 110 may be comprised of any storage devices known in the art. For example, the storage device 108 may be a solid state drive (SSD) and the storage device 110 may be a hard disk drive (HDD).

The DRAM cache 112 forms the higher tier of the two-tiered cache 104, and the SCM cache 114 forms the lower tier of the two-tiered cache. The DRAM cache 112 has a lower latency and a lower storage capacity than the SCM cache 114.

A LRU list 118 for each type of cache (e.g., one LRU list for the DRAM cache 112, and another LRU list for the SCM cache 114) is maintained in the storage controller 102 by the cache management application 116.

The cache management application 116 receives indications from a host application 120 on whether tracks used by the host application 120 should be demoted from the cache 104 after a time duration referred to as a maximum retention time if the track is not accessed within the maximum retention time. The host application 120 may also indicate minimum retention time for tracks to the cache management application 116.

A plurality of tracks 121, 122 may have minimum retention times 124, 126 and maximum retention times 128, 130 indicated by a host application 120. Another plurality of tracks 132, 134 may have no indications of minimum or maximum retention time (as shown via reference numerals 136, 138). The LRU list 118 may include some of the plurality of tracks 121, 122 and some of the plurality of tracks 132, 134, i.e., the LRU list 118 includes tracks in the cache 104 with maximum and minimum retention times and tracks in the cache 104 without maximum or minimum retention times. The LRU list 118 is used by the cache management application 116 to determine which tracks to demote from the cache 104.

Figure 2:
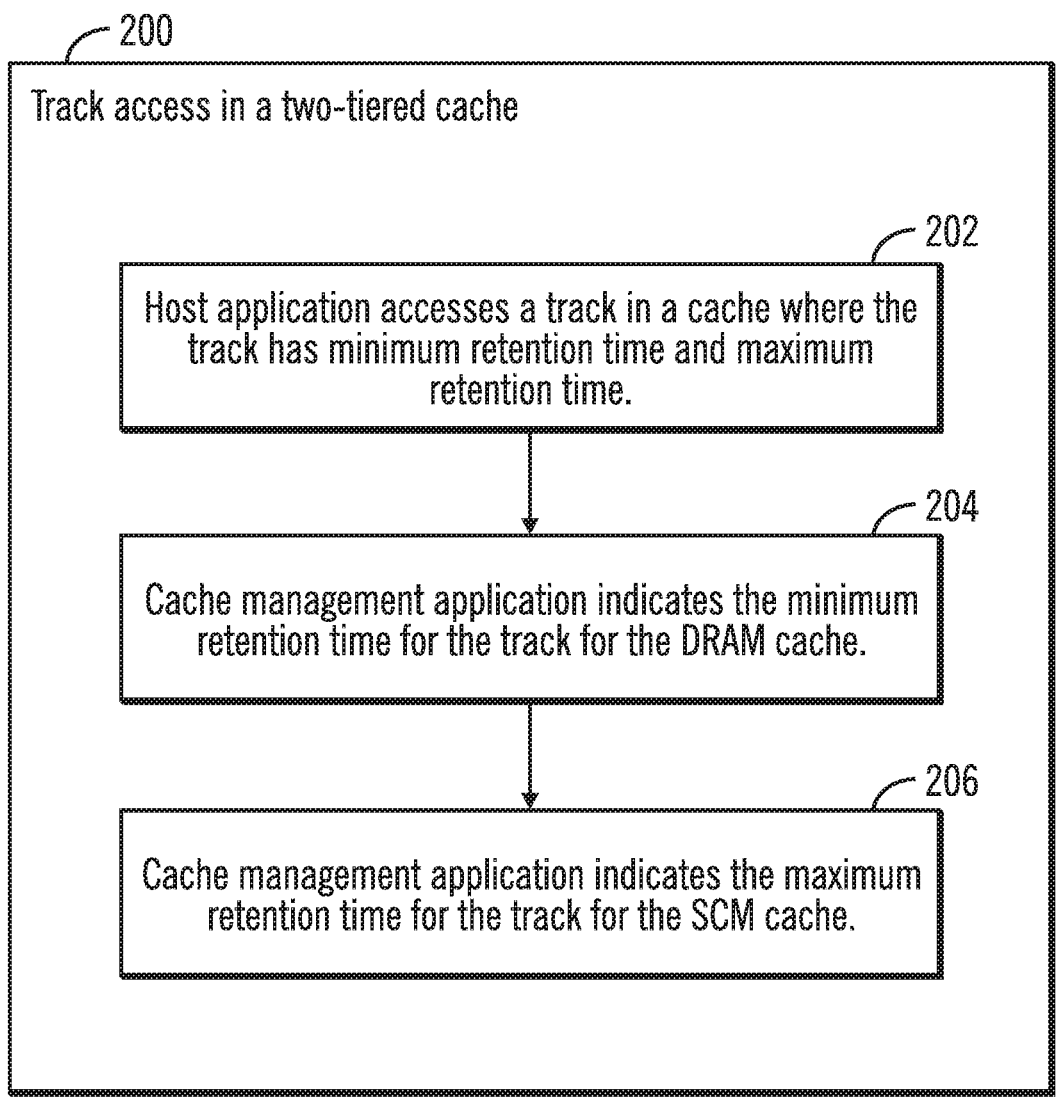
FIG. 2 illustrates a flowchart that shows operations for track access in a two-tiered cache, in accordance with certain embodiments.

FIG. 2 illustrates a flowchart 200 that shows operations for track access in a two-tiered cache, in accordance with certain embodiments.

Control starts at block 202 in which a host application 120 accesses a track in a cache 104 where the track has a minimum retention time and a maximum retention time. Control proceeds to block 204 in which the cache manage-ment application 116 indicates the minimum retention time for the track for the DRAM cache 112 (i.e., the track has a minimum retention time for the DRAM cache 112). From block 204 control proceeds to block 206 in which the cache management application 116 indicates the maximum retention time for the track for the SCM cache 114 (i.e., the track has a maximum retention time for the SCM cache 114). Therefore, a track has a minimum retention time in the DRAM cache 112 and a maximum retention time in the SCM cache 114, in response to minimum and maximum retention times being indicated for the track by a host application 120.

Figure 3:
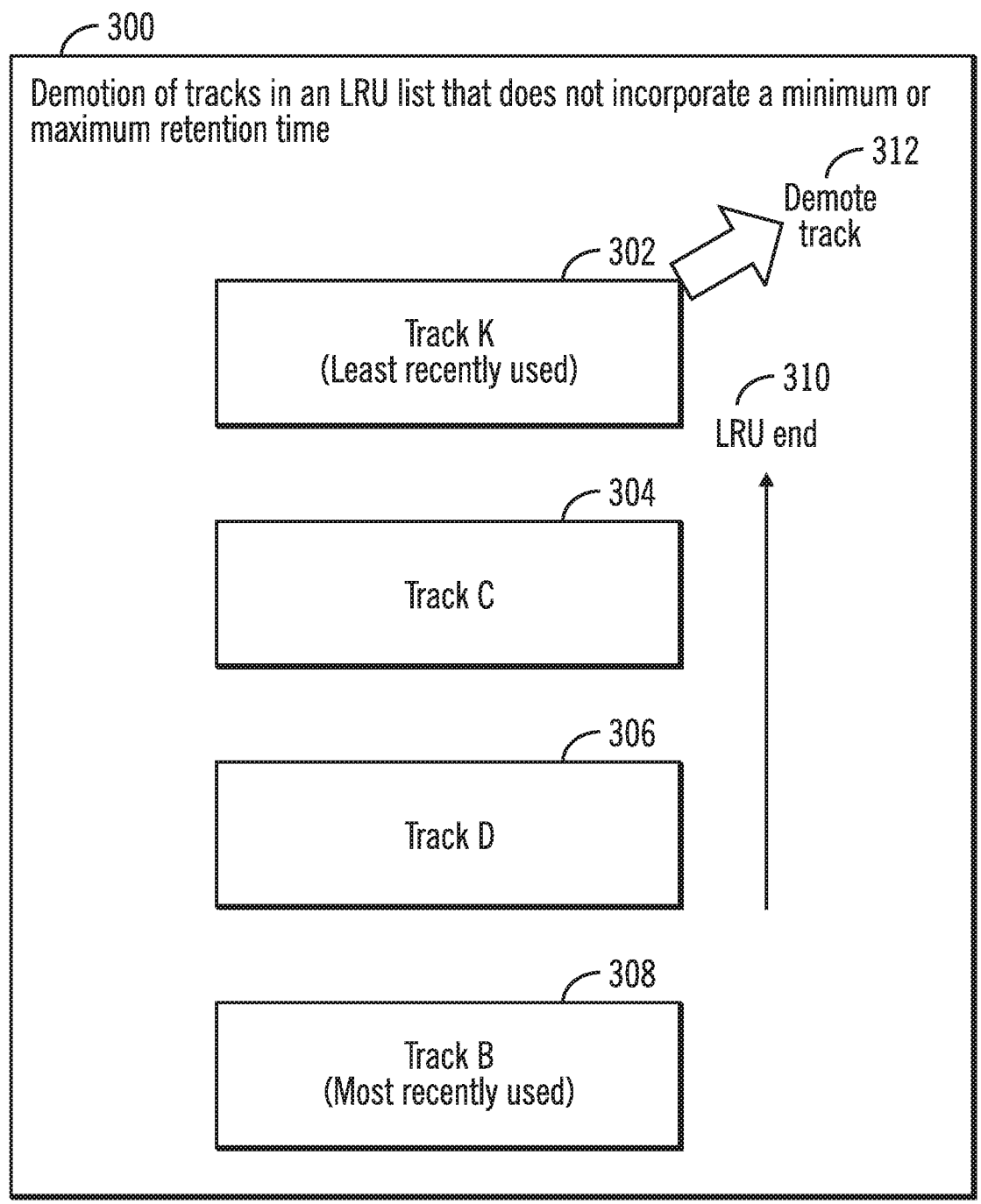
FIG. 3 illustrates a block diagram that shows demotion of tracks from an LRU list that does not incorporate a minimum or maximum retention time for selected tracks, in accordance with certain embodiments.

FIG. 3 illustrates a block diagram 300 that shows demotion of tracks from a LRU list that does not incorporate a minimum or maximum retention time for selected tracks, in accordance with certain embodiments. The LRU list may comprise either an LRU list for the DRAM cache 112 (referred to as a DRAM cache LRU list) or an LRU list for the SCM cache 114 (referred to as a SCM cache LRU list) as shown in FIG. 1, via reference numeral 118.

For simplicity, only four tracks, denoted as track K 302, track C 304, track D 306, and track B 308 are shown in FIG. 3, although a typical LRU list may have thousands or tens of thousands of tracks.

The LRU end of the list is towards the top (as shown via reference numeral 310). As a result, track K 302 is the least recently used track, and track B 308 is the most recently used track. Track K 302 which is the least recently used track is demoted first in a conventional i.e., default) LRU based cache replacement policy (as shown via reference numeral 312).

Figure 4:
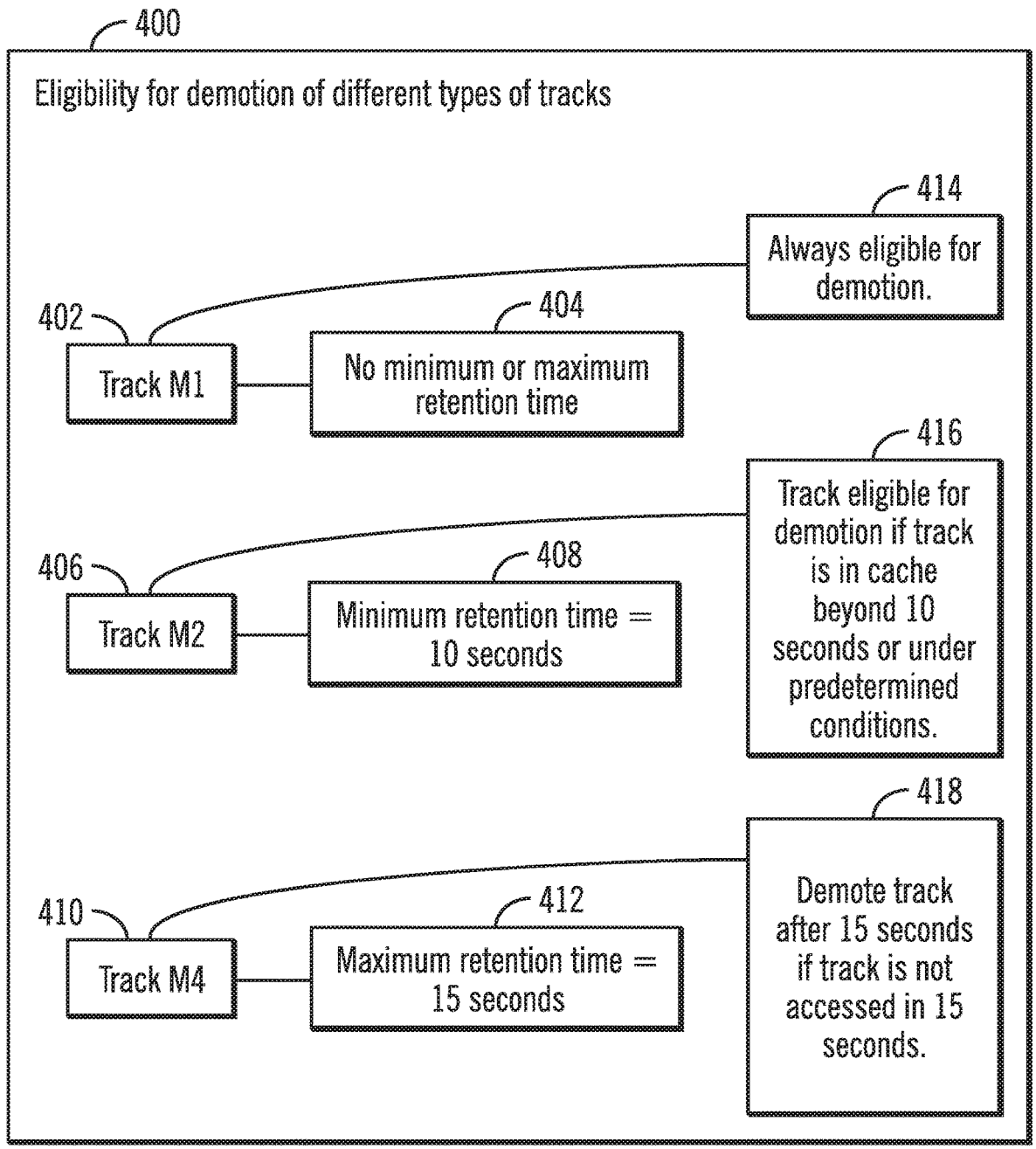
FIG. 4 illustrates a block diagram that shows the eligibility for demotion of different types of tracks, in accordance with certain embodiments.

FIG. 4 illustrates a block diagram 400 that shows the eligibility for demotion of different types of tracks in a cache 104 in accordance with certain embodiments.

Track M1 402 has no minimum or maximum retention time 404 indicated by the host application 120. As a result, track M1 402 is always eligible for demotion when track M1 402 reaches the LRU end of the LRU list 118 (as shown via reference numeral 414).

Track M2 406 has a minimum retention time 408 of 10 seconds indicated by the host application 120. As a result, track M2 406 should be demoted if track M2 406 is in the cache beyond 10 seconds without being accessed or under certain predetermined conditions (as shown via reference numeral 416).

Track M4 410 has a maximum retention time 412 of 15 seconds indicated by the host application 120. As a result, track M4 410 should be demoted if track M4 410 is in cache beyond 15 seconds without being accessed (as shown via reference numeral 418).

Figure 5:
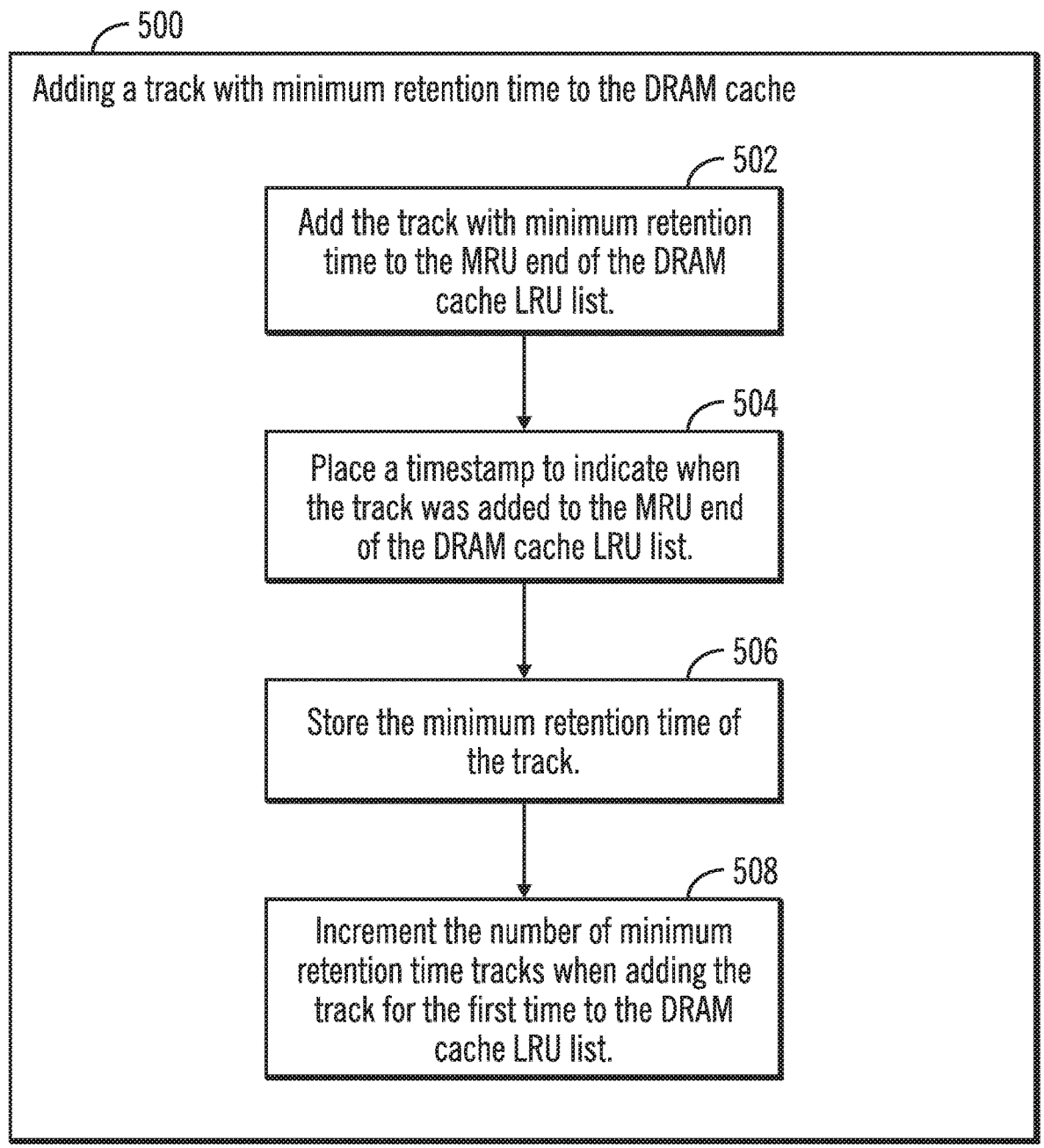
FIG. 5 illustrates a flowchart that shows operations for adding a track with a minimum retention time to the DRAM cache, in accordance with certain embodiments.

FIG. 5 illustrates a flowchart 500 that shows operations for adding a track with a minimum retention time to the DRAM cache 112, in accordance with certain embodiments. The operations shown in FIG. 5 may be performed by the cache management application 116 that executes in the storage controller 102. The operations shown in FIG. 5 improves the performance of the storage controller 102 by preventing potential cache misses should there be indications of minimum retention time for certain tracks in the two-tiered cache 104.

Control starts at block 502 in which the cache management application 116 adds the track with minimum retention time to the MRU end of the DRAM cache LRU list 118. Control proceeds to block 504 in which the cache management application 116 places a timestamp to indicate when the track was added to the MRU end of the DRAM cache LRU list 118. The timestamp is kept in association with the track that is added to the DRAM cache LRU list 118.

From block 504 control proceeds to block 506 in which the cache management application 116 stores the minimum retention time of the track in association with the track that is added to the DRAM cache LRU list 118. The cache management application 116 then increments (i.e., adds the number 1) to the number of minimum retention time tracks (as shown via block 508) when adding the track for the first time to the DRAM cache LRU list 118.

Therefore, FIG. 5 shows certain embodiments in which tracks are added to the DRAM cache LRU list 118 with indication of the minimum retention time and a timestamp that records the time at which the track was added to the DRAM cache LRU list. The number of tracks with minimum retention time is updated when a track with a minimum retention time is added to the DRAM cache LRU list 118 for the first time.

Figure 6:
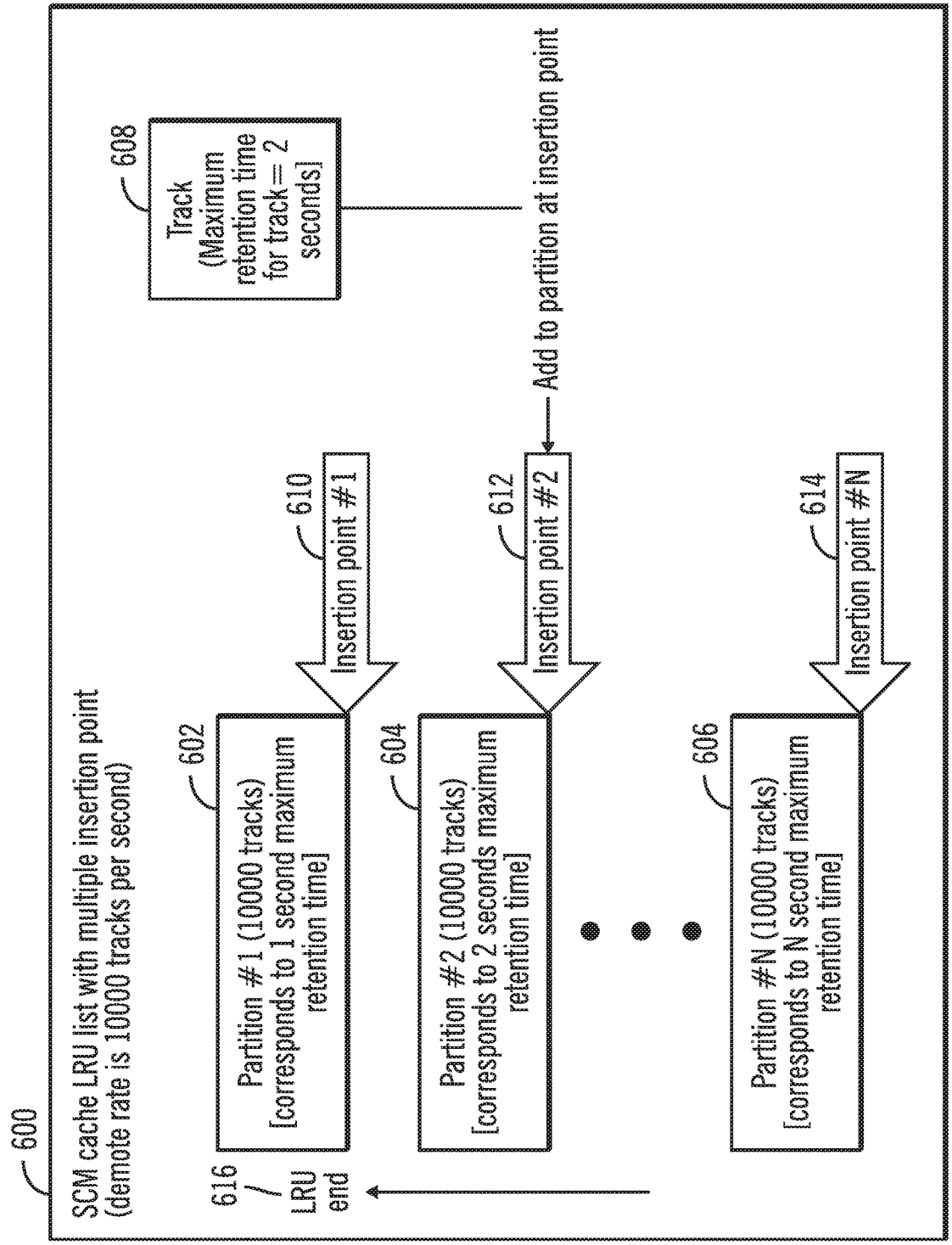
FIG. 6 illustrates a block diagram that shows a SCM cache LRU list with multiple insertion points, in accordance with certain embodiments.

FIG. 6 illustrates a block diagram 600 that shows a SCM cache LRU list (e.g., a LRU list for the SCM cache 114 as indicated via the LRU list 118) with multiple insertion points, in accordance with certain embodiments.

In certain embodiments, an exemplary demote rate is 10000 tracks per second, i.e., 10000 tracks are on an average demoted from the cache every second. In such embodiments, the tracks on the SCM cache LRU list are partitioned into a plurality of partitions 602, 604, 606 where each partition includes 10000 tracks and insertion points 610, 612, 614 for new tracks to be added are at the end of each partition.

In FIG. 6, partition #1 602 corresponds to a maximum retention time of 1 seconds, partition #2 604 corresponds to a maximum retention time of 2 seconds, and partition #N 606 corresponds to ta maximum retention time of N seconds. The lowest retention time is towards the LRU end of the SCM cache LRU list as shown via reference numeral 616.

If a track with a maximum retention time of 2 seconds needs to be inserted into the SCM cache LRU list then the track is added to the insertion point #2 612 (as shown via reference numerals 608, 610).

Therefore, FIG. 6 shows how a SCM cache LRU list has multiple insertion points corresponding to different amounts of time a track has been retained in a SCM cache since the last access of the track, and how a track with a maximum retention time is inserted into the SCM cache LRU list. It should be noted that when a track is inserted then some of the insertion points may need to be adjusted. For example, on inserting track 608, the insertion point #2 612 moves one track vertically downwards in FIG. 6, as partition #2 604 would have 10001 tracks after insertion of track 608.

Figure 7:
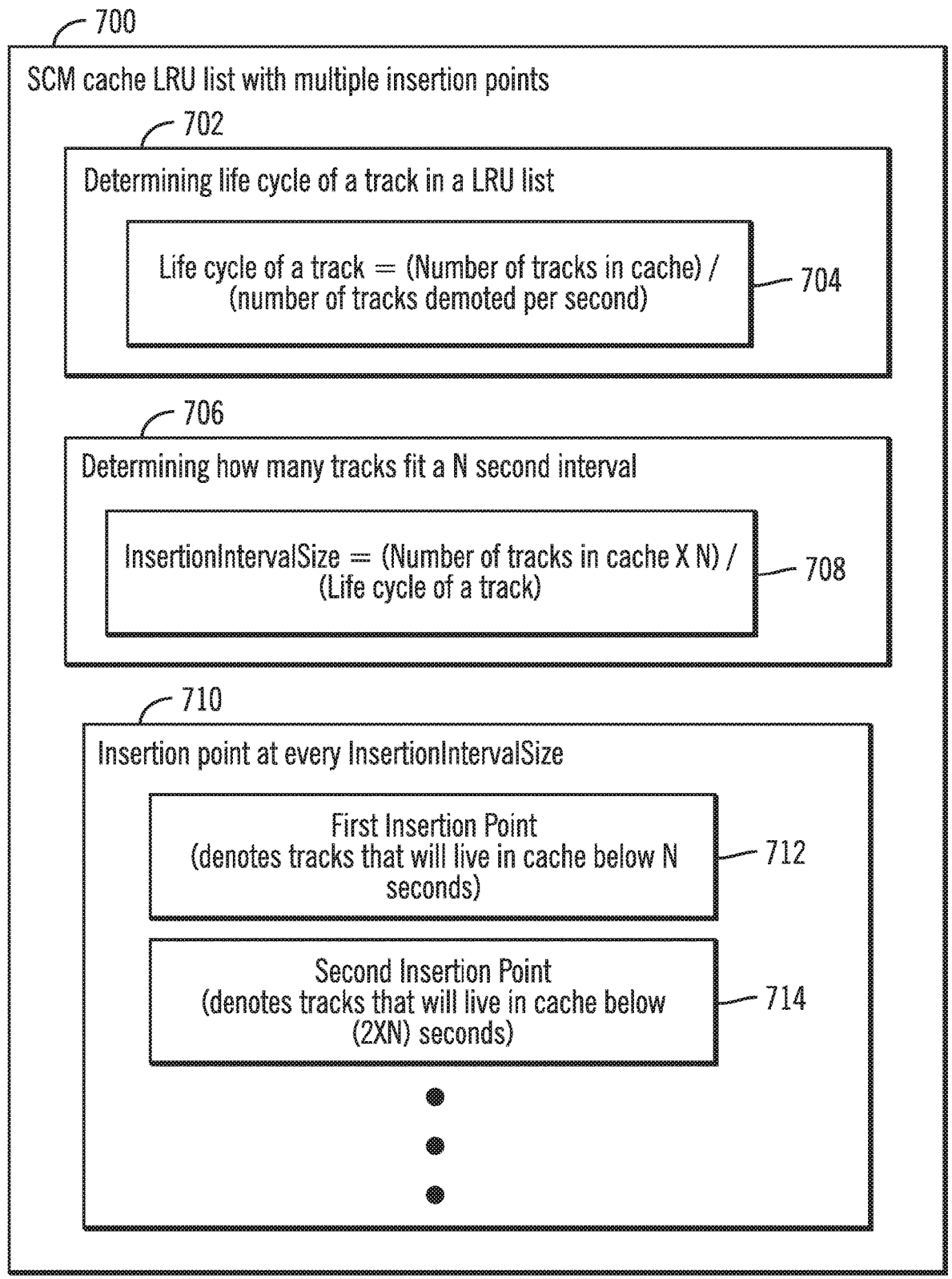
FIG. 7 illustrates a block diagram that shows how a SCM cache LRU list with multiple insertion points is generated, in accordance with certain embodiments.

FIG. 7 illustrates a block diagram 700 that shows how a SCM cache LRU list (i.e., a LRU list for the SCM cache 114 as indicated via the LRU list 118) with multiple insertion points is generated, in accordance with certain embodiments.

The cache management application 116 determines the life cycle of a track in a SCM cache LRU list (as shown via reference numerals 702, 704). This may be performed via different mechanisms. One mechanism is to determine the demote rate and then use the demote rate and cache size to find out the approximate life cycle of a track via the following calculation: Life cycle of a track=(Number of tracks in cache)/(number of tracks demoted per second).

Then the cache management application 116 determines how many tracks fit in a N second interval (referred to as InsertionIntervalSize) as follows: InsertionIntervalSize= (Number of tracks in cache×N)/(Life cycle of a track) [as shown via reference numerals 706, 708].

There is an insertion point at every InsertionIntervalSize (as shown via reference numeral 710). The first insertion point 712 denotes tracks that will be retained in the SCM cache below N seconds. Second insertion point 714 denotes tracks that will be retained in SCM cache below 2×N seconds, and so on.

Figure 8:
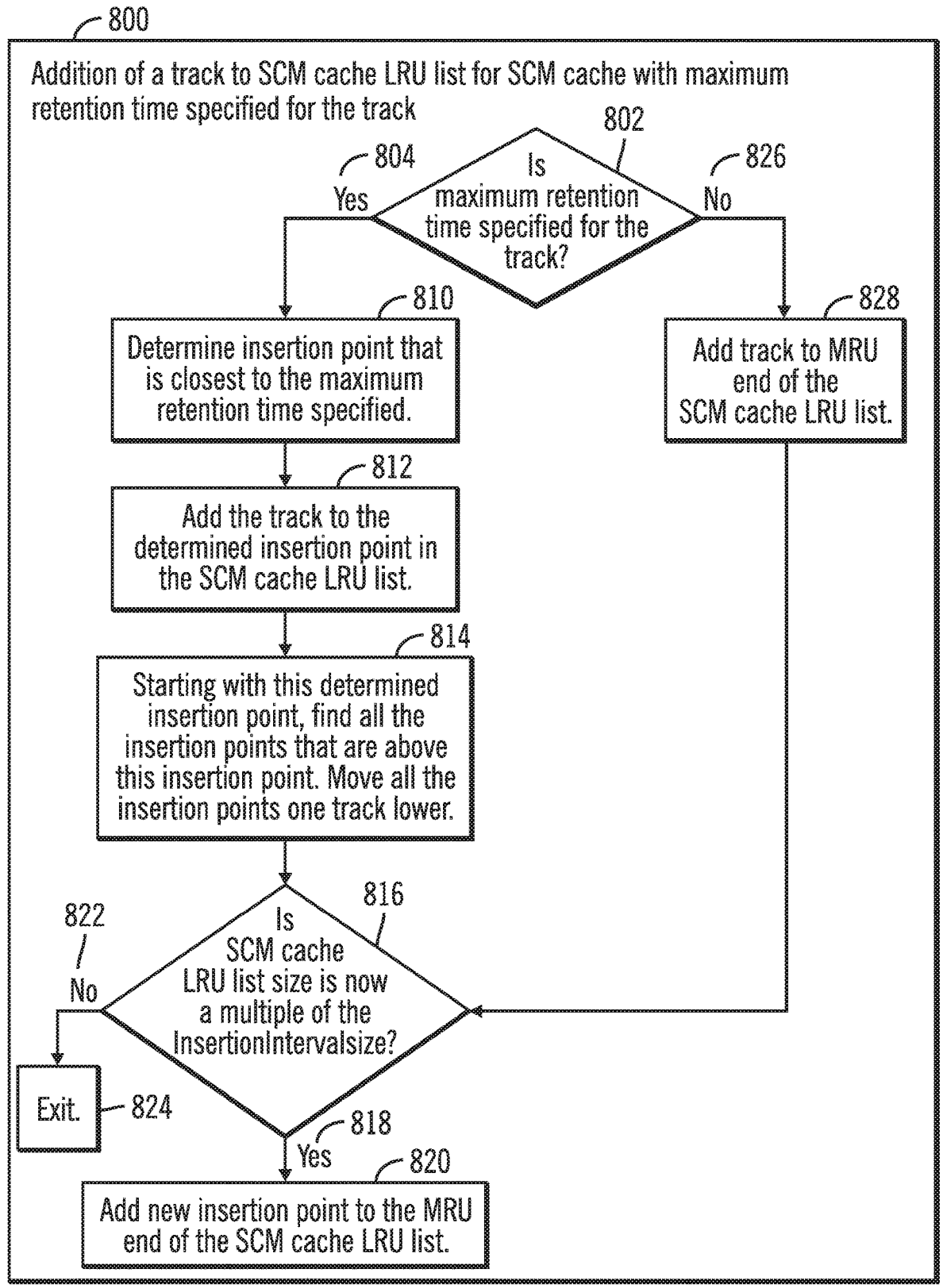
FIG. 8 illustrates a flowchart that shows the addition of a track to a SCM cache LRU list with maximum retention time specified for the track, in accordance with certain embodiments.

FIG. 8 illustrates a flowchart 800 that shows the addition of a track to a SCM cache LRU list (i.e., a LRU list for the SCM cache 114 as indicated via the SCM cache LRU list 118), in accordance with certain embodiments. The operations shown in FIG. 8 may be performed by the cache management application 116 that executes in the storage controller 102.

Control starts at block 802 in which the cache management application 116 determines whether a maximum retention time is specified for a track that is to be added to the SCM cache LRU list 118. If so ("Yes" branch 804) control proceeds to block 810 in which the cache management application 116 determines the insertion point that is closest to the maximum retention time specified. The cache management application 116 adds (at block 812) the track to the determined insertion point in the SCM cache LRU list 118.

From block 812 control proceeds to block 814 in which the cache management application 116 starts with the determined insertion point and finds all the insertion points that are above (i.e., have time durations for insertion that are more) the insertion point. The cache management application 116 moves all the insertion points one track lower (where lower corresponds to movement of the insertion point towards tracks that are expected to be longer in the cache).

The cache management application 116 then determines (at block 816) whether the SCM cache LRU list size is a multiple of the InsertionIntervalSize. If so ("Yes" branch 818) control proceeds to block 820 where a new insertion point is added to the MRU end of the SCM cache LRU list 118 (For example, if InsertionintervalSize is 10000 and the size of the SCM cache LRU list becomes 20000, then a new insertion point may be added at the MRU end). If not ("No" branch 822), the process exits (at block 824).

If at block 802 the cache management application 116 determines that the track does not have a maximum retention time ("No" branch 826) then control proceeds to block 828 where the track is added to the MRU end of the SCM cache LRU list 118. For example, lnsertionlntervalSize is 10000 and the size of the SCM cache LRU list becomes 20000, then a new insertion point is added at the MRU end.

Therefore, FIG. 8 illustrates certain embodiments for adding tracks to the SCM cache LRU list 118.

Figure 9:
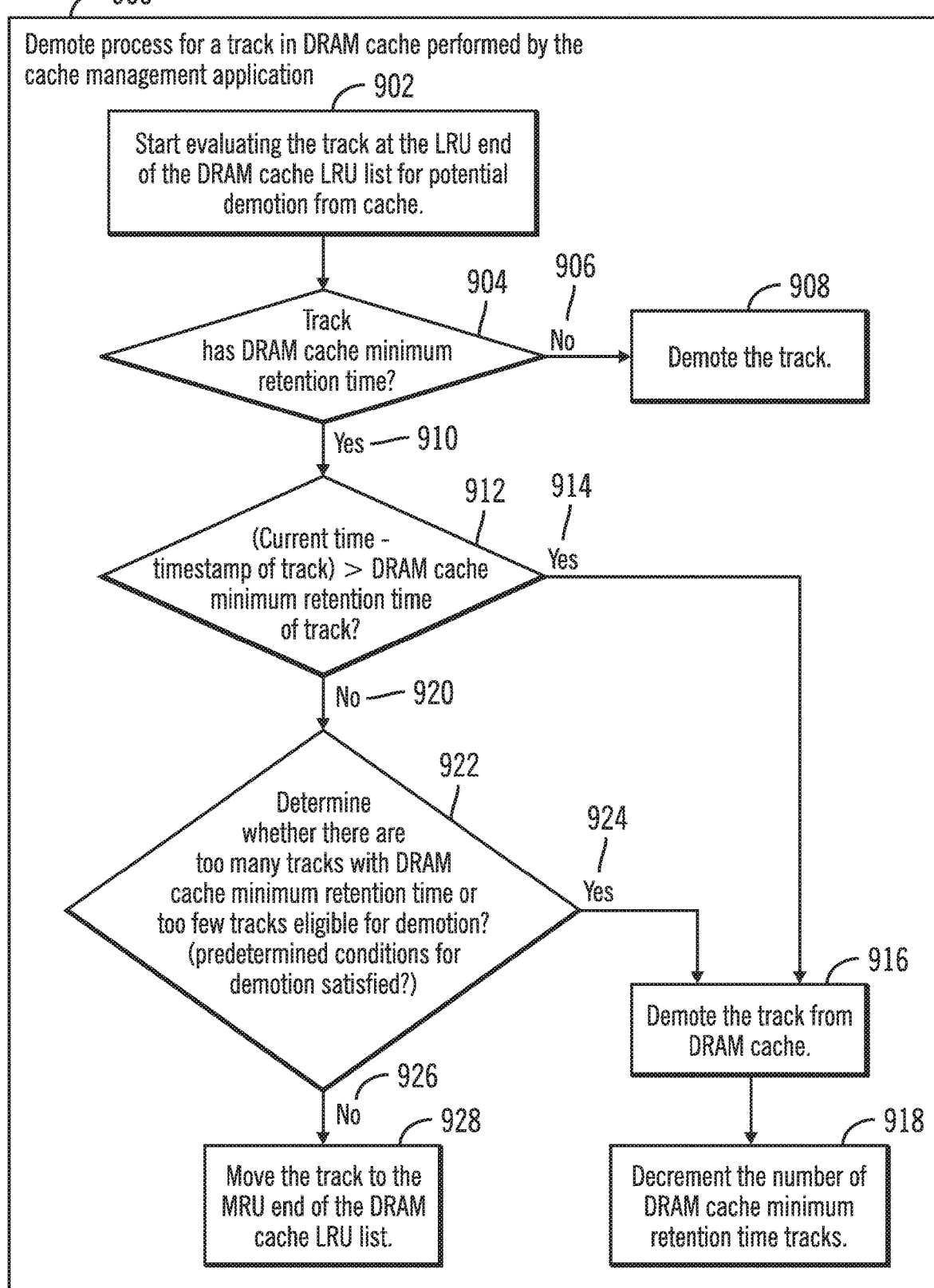
FIG. 9 illustrates a flowchart that shows operations for a demote process for a track in DRAM cache performed by the cache management application, in accordance with certain embodiments.

FIG. 9 illustrates a flowchart 900 that shows the demote process for a track in the DRAM cache 112 as performed by a cache management application 116, in accordance with certain embodiments. The operations shown in FIG. 9 improve the performance of the storage controller 102 by reducing cache misses should there be indications of minimum retention time for certain tracks in the DRAM cache 112.

Control starts at block 902 in which the cache management application 116 starts evaluating the track at the LRU end of the DRAM cache LRU list 118 (i.e., the LRU list for the DRAM cache 112) for potential demotion from the DRAM cache 112. Control proceeds to block 904 in which the cache management application 116 determines whether the track has a minimum retention time. If not ("No" branch 906), then the cache management application 116 demotes (at block 908) the track from the DRAM cache 112.

If at block 904 the cache management application 116 determines that the track has a minimum retention time ("Yes" branch 910) then control proceeds to block 912 in which the cache management application 116 determines whether the difference of the current time from the timestamp of the track is greater than the minimum retention time of the track (i.e., whether the track has been in the DRAM cache for a time that exceeds the minimum retention time). If so ("Yes" branch 914) then the track is demoted (at block 916) and the cache management application 116 decrements (i.e., subtracts the number 1) the number of minimum retention time tracks in the DRAM cache 112 (at block 918).

If at block 912 it is determined that the difference of the current time from the timestamp of the track is not greater than the minimum retention time of the track (i.e., the track has not been in the DRAM cache for a time that exceeds the minimum retention time) ["No" branch 920] control proceeds to block 922 to determine whether the track should be demoted to prevent the DRAM cache 112 from becoming full.

At block 922 the cache management application 116 determines whether there are too many tracks with minimum retention time or too few tracks that are eligible for demotion from the cache that may cause the cache to become full. What is "too many" and what is "too few" is determined based on certain predetermined conditions, where some exemplary predetermined conditions are described later.

If at block 922 the cache management application 116 determines that there are too many tracks with minimum retention time or too few tracks that are eligible for demotion from the DRAM cache that may cause the DRAM cache to become full ("Yes" branch 924) then control proceeds to block 916 in which the track is demoted and the number of minimum retention time tracks is decremented (at block 918).

If at block 922 the cache management application 116 determines that that neither are there too many tracks with minimum retention time nor are there too few tracks that are eligible for demotion from the DRAM cache that may cause the DRAM cache to become full ("No" branch 926) then there is no danger of the DRAM cache 112 becoming full and the cache management application 116 moves (at block 928) the track to the MRU end of the DRAM cache LRU list 118 (i.e., the track is retained in the DRAM cache 112 and moved to the MRU end of the DRAM cache LRU list 118).

Therefore, FIG. 9 illustrates certain embodiments in which tracks that are indicated as having a minimum retention time are preferred for storing in the DRAM cache at least till the expiry of the minimum retention time unless the DRAM cache 112 is in danger of becoming full.

Figure 10:
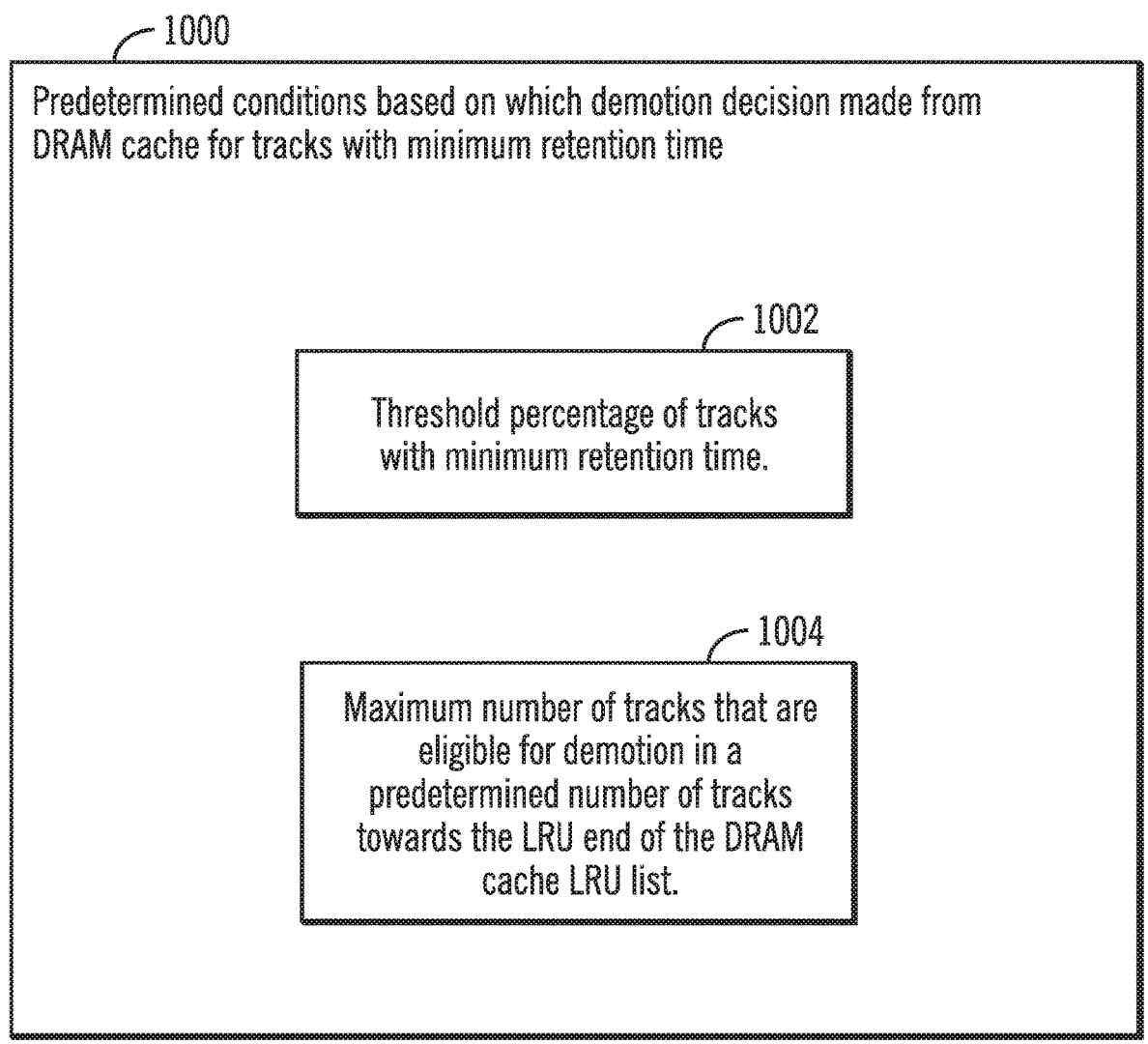
FIG. 10 illustrates a block diagram that shows predetermined conditions based on which a demotion decision for a track with minimum retention time is made in the DRAM cache, in accordance with certain embodiments.

FIG. 10 illustrates a block diagram 1000 that shows predetermined conditions based on which a demotion decision for a track with minimum retention time is made in the DRAM cache, in accordance with certain embodiments.

A threshold indicating the percentage of tracks with minimum retention time above which tracks with minimum retention time are eligible for demotion is maintained (as shown via reference numeral 1002) in the storage controller 102. For example, in certain embodiments the threshold may be 50%, and as a result more if more than 50% of the tracks in the cache are tracks with minimum retention time, then one or more tracks with minimum retention time may be demoted.

A "maximum number" of tracks that are eligible for demotion in a "predetermined number" of tracks towards the LRU end of the DRAM cache LRU list 118 is maintained (as shown via reference numeral 1004) in the storage controller 102. For example, if the cache management application 116 scans N tracks from the bottom of the DRAM cache LRU list (i.e., the N least recently used tracks, where N is a number) and finds less than M tracks eligible to demote because of minimum retention time requirements, then tracks with a minimum retention time may be demoted (i.e., M is the maximum number and N is the "predetermined number"). For example, if the cache management application 116 scans 1000 tracks from the bottom of DRAM cache LRU list (i.e., the 1000 least recently used tracks) to demote and only finds less than 100 as being eligible for demotion then tracks with minimum retention time may be demoted.

Figure 11:
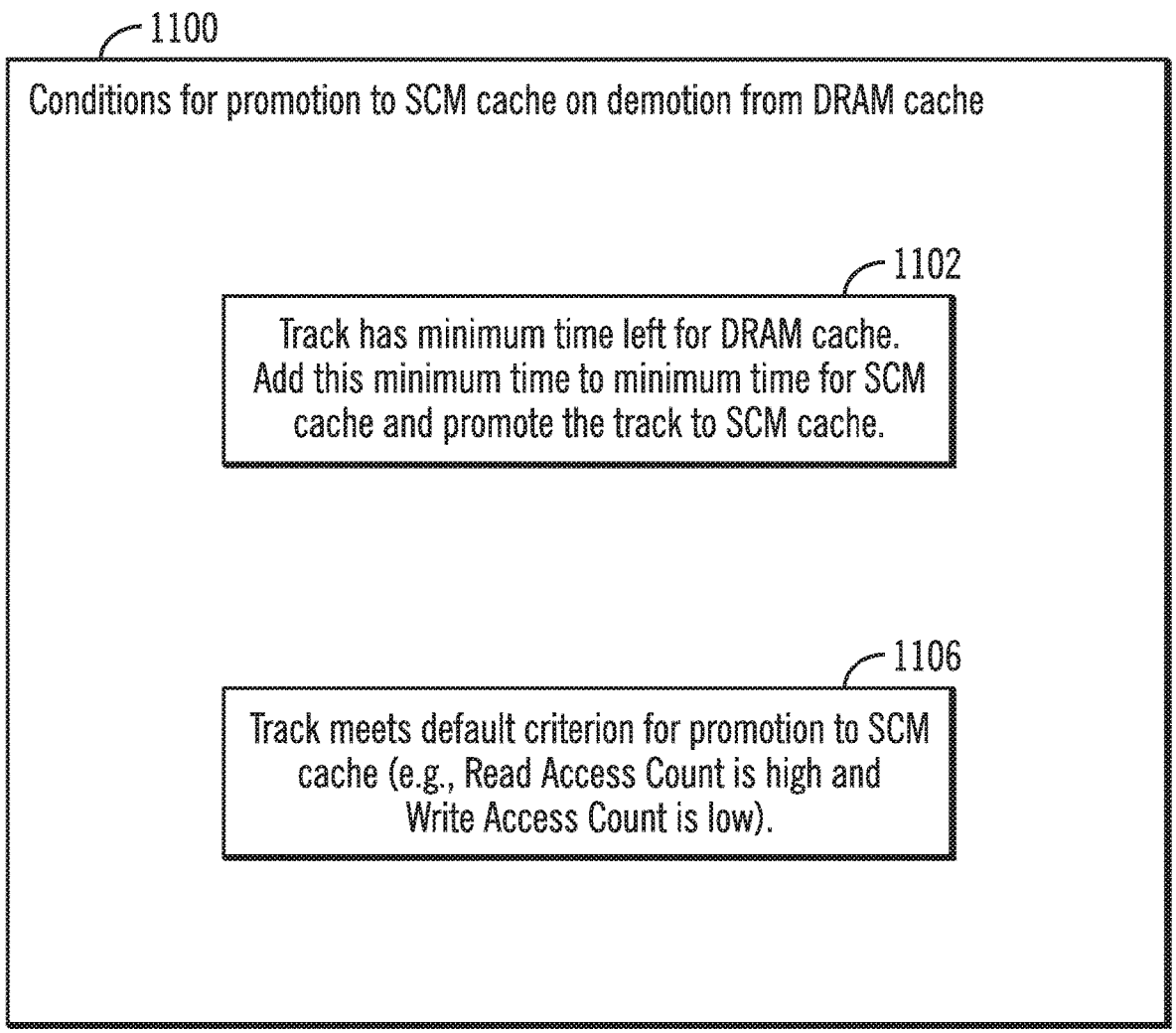
FIG. 11 illustrates a block diagram that shows conditions for promotion to SCM cache on demotion from DRAM cache, in accordance with certain embodiments.

FIG. 11 illustrates a block diagram 1100 that shows condition for promotion (i.e., addition) to SCM cache 114 on demotion from DRAM cache 112 of a track, in accordance with certain embodiments. When a track is demoted from the DRAM cache, the track can be promoted to SCM cache if any of the following conditions apply:

(i) Track has minimum time left for DRAM cache. Then this minimum time is added to the minimum time for SCM cache and the track is promoted to SCM cache (reference numeral 1102);

(ii) Track meets default criterion for promotion to SCM cache [e.g., A Read Access Count is high and a Write Access Count is low, i.e., a lot of read accesses and few write accesses of the track are taking place in the DRAM cache] (reference numeral 1106).

Figure 12:
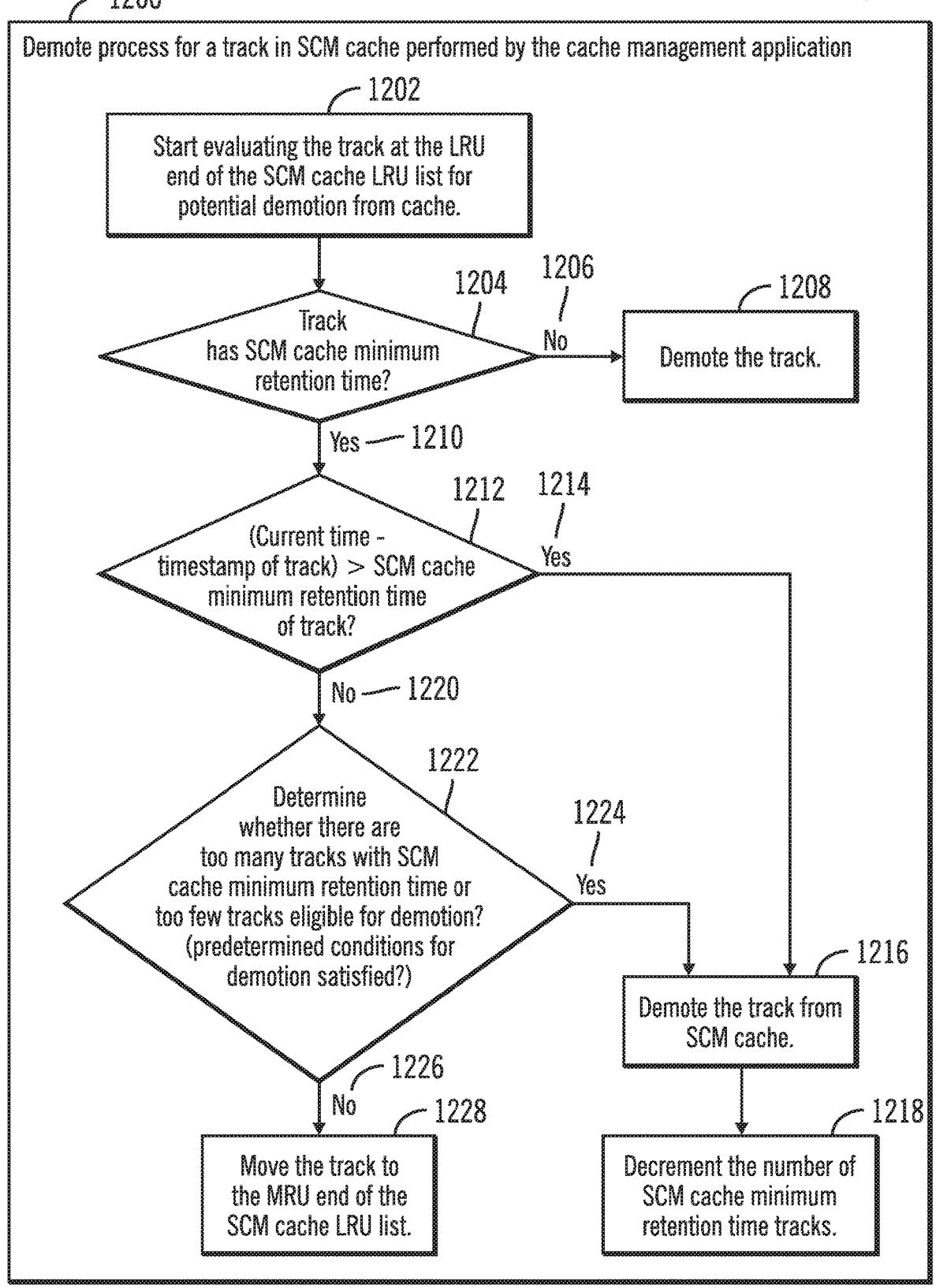
FIG. 12 illustrates a flowchart that shows operations for a demote process for a track in SCM cache performed by the cache management application, in accordance with certain embodiments.

FIG. 12 illustrates a flowchart 1200 that shows the demote process for a track in the SCM cache 114 as performed by the cache management application 116, in accordance with certain embodiments. The operations shown in FIG. 12 improves the performance of the storage controller 102 by reducing cache misses should there be indications of minimum retention time for certain tracks in the SCM cache 114.

Control starts at block 1202 in which the cache management application 116 starts evaluating the track at the LRU end of the SCM cache LRU list 118 for potential demotion from the SCM cache 114. Control proceeds to block 1204 in which the cache management application 116 determines whether the track has a minimum retention time. If not ("No" branch 1206), then the cache management application 116 demotes (at block 1208) the track from the SCM cache 114.

If at block 1204 the cache management application 116 determines that the track has a minimum retention time ("Yes" branch 1210) then control proceeds to block 1212 in which the cache management application 116 determines whether the difference of the current time from the timestamp of the track is greater than the minimum retention time of the track (i.e., whether the track has been in the SCM cache for a time that exceeds the minimum retention time). If so ("Yes" branch 1214) then the track is demoted (at block 1216) and the cache management application 116 decrements (i.e., subtracts the number 1) the number of minimum retention time tracks in the SCM cache 114 (at block 1218).

If at block 1212 it is determined that the difference of the current time from the timestamp of the rack is not greater than the minimum retention time of the track (i.e., the track has not been in the SCM cache for a time that exceeds the minimum retention time) ["No" branch 1220] control proceeds to block 1222 to determine whether the track should be demoted to prevent the SCM cache 114 from becoming full.

At block 1222 the cache management application 116 determines whether there are too many tracks with minimum retention time or too few tracks that are eligible for demotion from the cache that may cause the cache to become full. What is "too many" and what is "too few" is determined based on certain predetermined conditions, where some exemplary predetermined conditions are described later.

If at block 1222 the cache management application 116 determines that there are too many tracks with minimum retention time or too few tracks that are eligible for demotion from the SCM cache that may cause the SCM cache to become full ("Yes" branch 1224) then control proceeds to block 1216 in which the track is demoted and the number of minimum retention time tracks is decremented (at block 1218).

If at block 1222 the cache management application 116 determines that that neither are there too many tracks with minimum retention time nor are there too few tracks that are eligible for demotion from the SCM cache that may cause the SCM cache to become full ("No" branch 1226) then there is no danger of the SCM cache 114 becoming full and the cache management application 116 moves (at block 1228) the track to the MRU end of the SCM cache LRU list 118 (i.e., the track is retained in the SCM cache 114 and moved to the LRU end of the SCM cache LRU list 118).

Therefore, FIG. 12 illustrates certain embodiments in which tracks that are indicated as having a minimum retention time are preferred for storing in the SCM cache at least till the expiry of the minimum retention time unless the SCM cache 114 is in danger of becoming full.

Figure 13:
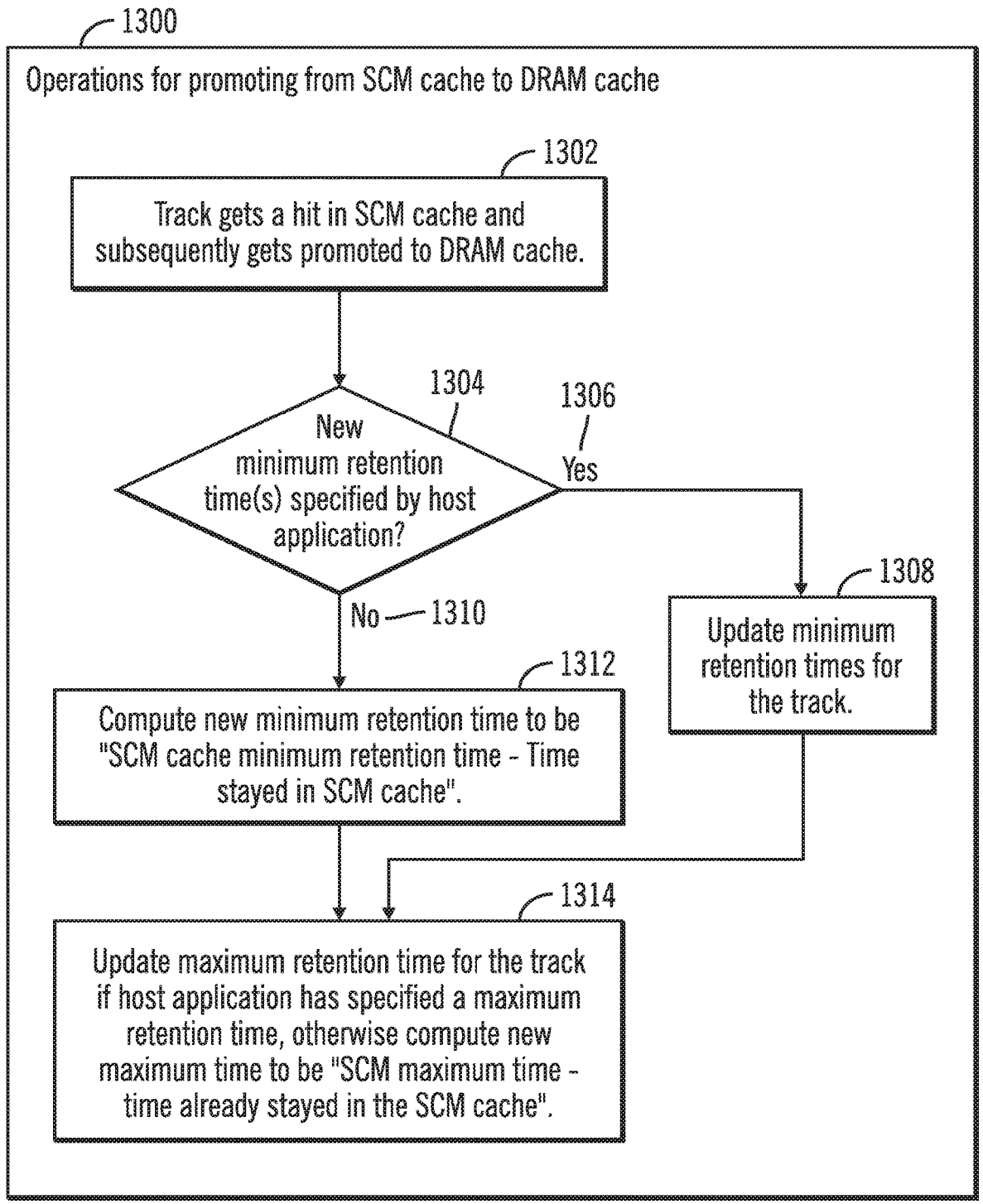
FIG. 13 illustrates a flowchart that shows operations for promoting from SCM cache to DRAM cache, in accordance with certain embodiments.

FIG. 13 illustrates a flowchart 1300 that shows operations for promotion from SCM cache to DRAM cache, in accordance with certain embodiments.

If track gets a hit in SCM cache and subsequently promoted to DRAM cache (at block 1302) then a determination is made (at block 1304) as to whether new minimum retention times have been specified by the host application for the track for the DRAM cache. If so ("Yes" branch 1306), then the cache management application 116 updates (at block 1308) the minimum retention times for the track. If not ("No" branch 1310), then the cache management application 116 computes new remaining minimum time based on the calculation "SCM minimum time—Time stayed in SCM cache" (reference numeral 1312).

From block 1312 control proceeds to block 1314 in which the cache management application 116 updates the maximum retention time for the track if the host application has specified a maximum retention time. Otherwise, the new maximum retention time for the track is computed to be the difference between the SCM maximum retention time and the time already stayed in the SCM cache. Control also proceeds to block 1314 from block 1308 as both minimum and maximum retention time may be specified by a host application. It should be noted that the demotion from the SCM cache is optional in certain embodiments.

Figure 14:
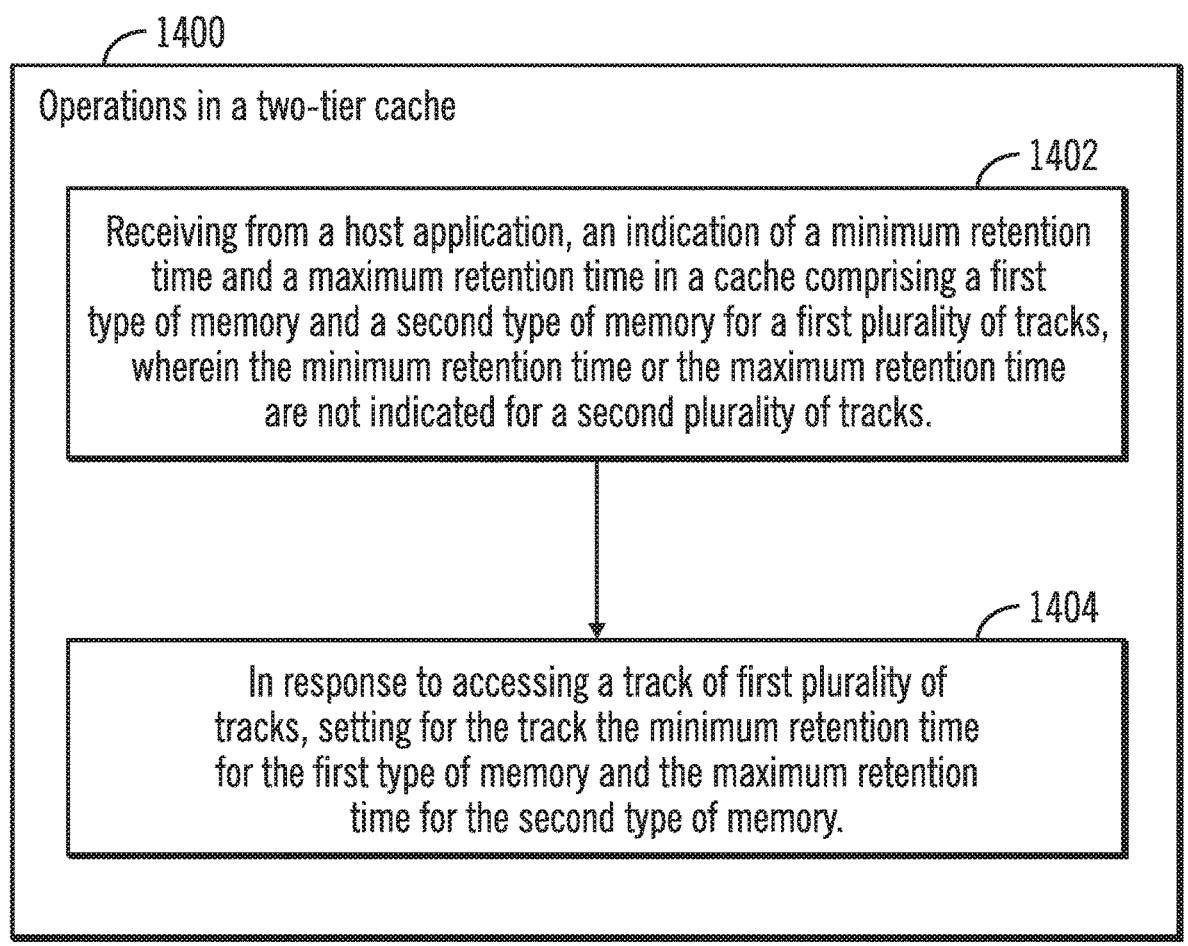
FIG. 14 illustrates a flowchart that shows operations performed in a two-tiered cache, in accordance with certain embodiments.

FIG. 14 illustrates a flowchart 1400 that shows operations performed in a two-tiered cache, in accordance with certain embodiments.

Control starts at block 1402 in which indications of a minimum retention time and a maximum retention time in a cache 104 comprising a first type of memory 112 and a second type of memory 114 are received from a host application 120 for a first plurality of tracks, wherein the minimum retention time or the maximum retention time are not indicated for a second plurality of tracks.

From block 1402 control proceeds to block 1404, in which in response to accessing a track of first plurality of tracks, the minimum retention time is set for the track for the first type of memory, and the maximum retention time is set for the track for the second type of memory. In certain embodiments, the first type of memory has a lower latency and a lower storage capacity than the second type of memory. In further embodiments, the first type of memory is a dynamic random access memory (DRAM) cache and the second type of memory is a storage class memory (SCM) cache. In certain embodiments, a cache management application attempts to maintain the track in the DRAM cache for at least a first amount of time that equals the minimum retention time, and attempts to maintain the track in the SCM cache for no more than a second amount of time that equals the maximum retention time.

Therefore FIGS. 1-14 illustrate certain embodiments for managing a two-tiered cache with the higher tier being a DRAM cache and a lower tier being a SCM cache by integrating minimum and maximum retention times of tracks provided by a host application to a cache management application of a storage controller.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 15:
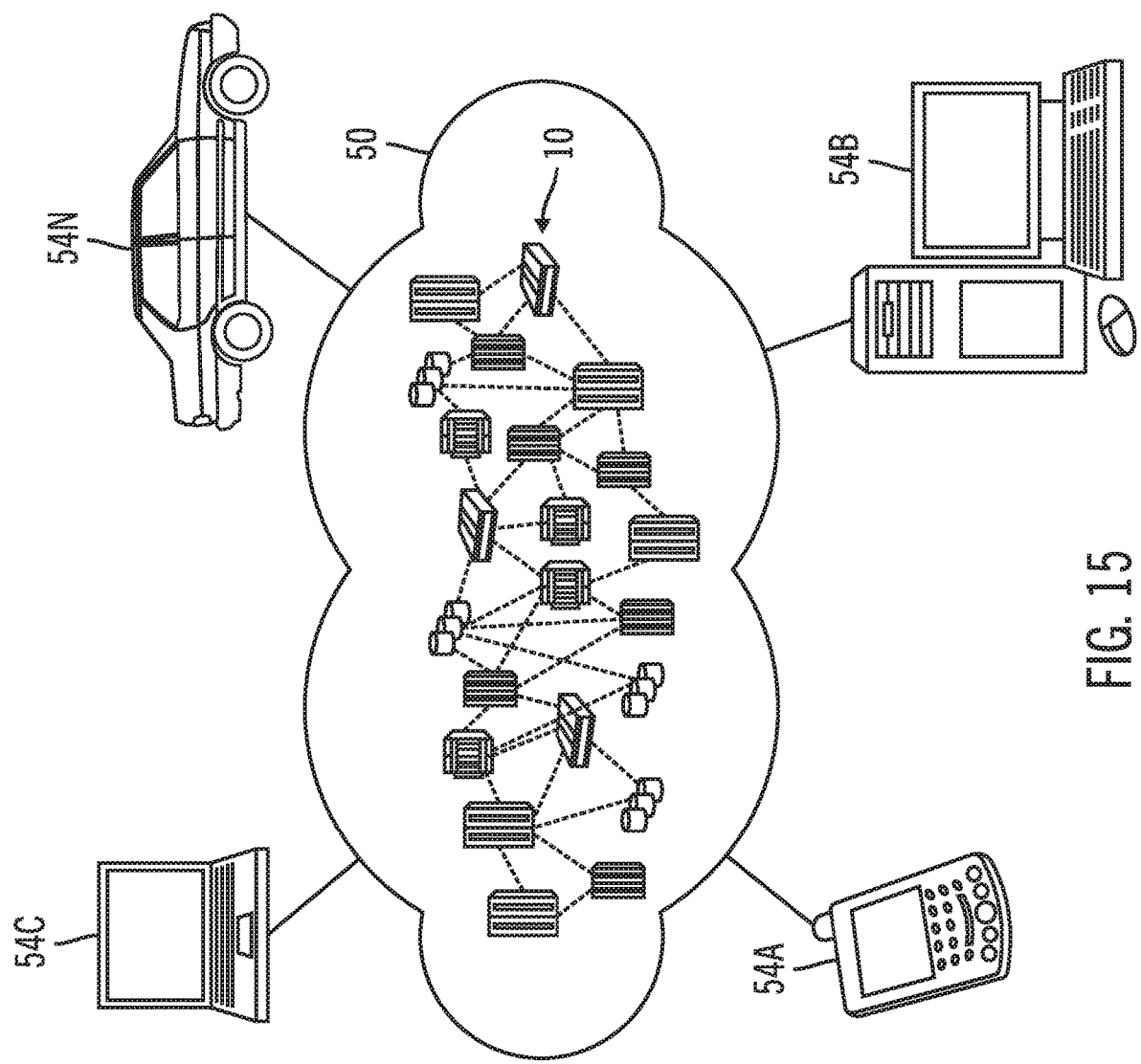
FIG. 15 illustrates a block diagram of a cloud computing environment, in accordance with certain embodiments.

Referring now to FIG. 15 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
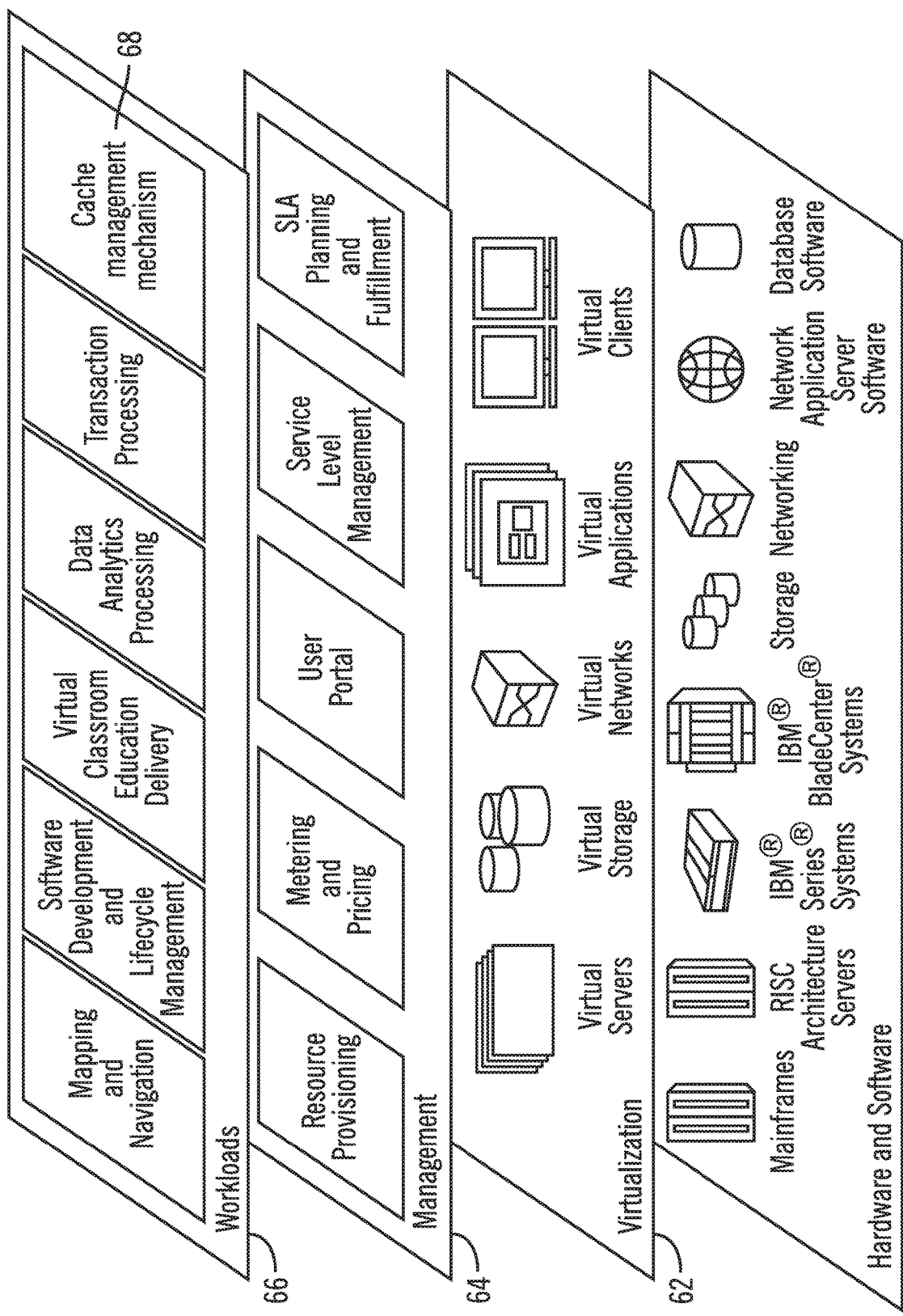
FIG. 16 illustrates a block diagram of further details of the cloud computing environment of FIG. 15, in accordance with certain embodiments.

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cache management mechanism 68 as shown in FIGS. 1-16.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 17:
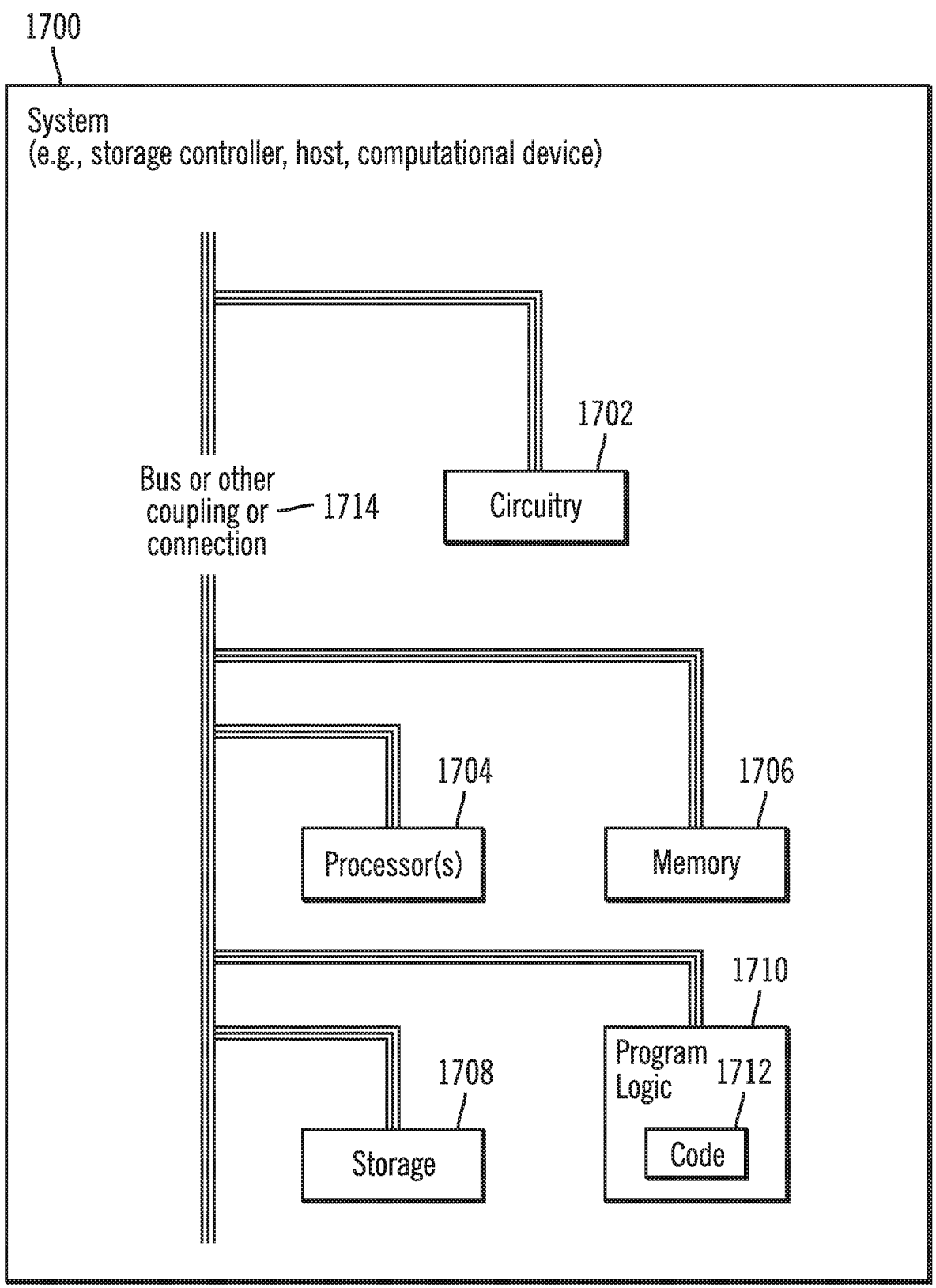
FIG. 17 illustrates a block diagram of a computational system that shows certain elements that may be included in the storage controller or the host, as described in FIGS. 1-16, in accordance with certain embodiments.

FIG. 17 illustrates a block diagram that shows certain elements that may be included in the storage controller 102 or the host 106, or other computational devices in accordance with certain embodiments. The system 1700 may include a circuitry 1702 that may in certain embodiments include at least a processor 1704. The system 1700 may also include a memory 1706 (e.g., a volatile memory device), and storage 1708. The storage 1708 may include a non-volatile memory device (e.g., EEPROM, ROM, PROM, flash, firmware, programmable logic, etc.), magnetic disk drive, optical disk drive, tape drive, etc. The storage 1708 may comprise an internal storage device, an attached storage device and/or a network accessible storage device. The system 1700 may include a program logic 1710 including code 1712 that may be loaded into the memory 1706 and executed by the processor 1704 or circuitry 1702. In certain embodiments, the program logic 1710 including code 1712 may be stored in the storage 1708. In certain other embodiments, the program logic 1710 may be implemented in the circuitry 1702. One or more of the components in the system 1700 may communicate via a bus or via other coupling or connection 1714. Therefore, while FIG. 17 shows the program logic 1710 separately from the other elements, the program logic 1710 may be implemented in the memory 1706 and/or the circuitry 1702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
receiving from a host application for a first plurality of tracks, an indication of a minimum retention time and a maximum retention time in a cache comprising a first type of memory and a second type of memory, wherein the minimum retention time or the maximum retention time are not indicated for a second plurality of tracks; and
in response to accessing a track of the first plurality of tracks, setting, for the track, the minimum retention time for the track to be stored in the first type of memory of the cache and the maximum retention time for the track to be stored in the second type of memory of the cache.

2. The method of claim 1, wherein the first type of memory has a lower latency and a lower storage capacity than the second type of memory.

3. The method claim 2, wherein the first type of memory is a dynamic random access memory (DRAM) cache and the second type of memory is a storage class memory (SCM) cache.

4. The method of claim 3, where a cache management application attempts to maintain the track in the DRAM cache for at least a first amount of time that equals the minimum retention time, and attempts to maintain the track in the SCM cache for no more than a second amount of time that equals the maximum retention time.

5. The method of claim 3, wherein an insertion point of the track in a first least recently used (LRU) list of the SCM cache for the track is determined based on the maximum retention time that the track is allowed to be retained in the SCM cache, wherein different insertion points in the first LRU list of the SCM cache correspond to different amounts of time that a selected track of the first plurality of tracks is expected to be retained in the SCM cache.

6. The method of claim 3, wherein the DRAM cache and the SCM cache form a two-tier cache with the DRAM cache being a higher tier and the SCM cache being a lower tier, and wherein tracks are promoted to the SCM cache from the DRAM cache in response to determining that a read access time exceeds a first predetermined threshold and a write access time is below a second predetermined threshold.

7. The method of claim 1, wherein tracks of the second plurality of tracks undergo a default mechanism for demotion from the cache.

8. A computer program product, the computer program product comprising a computer readable storage medium having computer readable program code embodied therewith, the computer readable program code configured to perform operations, the operations comprising:
receiving from a host application for a first plurality of tracks, an indication of a minimum retention time and a maximum retention time in a cache comprising a first type of memory and a second type of memory, wherein the minimum retention time or the maximum retention time are not indicated for a second plurality of tracks; and
in response to accessing a track of the first plurality of tracks, setting, for the track, the minimum retention time for the track to be stored in the first type of memory of the cache and the maximum retention time for the track to be stored in the second type of memory of the cache.

9. The computer program product of claim 8, wherein the first type of memory has a lower latency and a lower storage capacity than the second type of memory.

10. The computer program product claim 9, wherein the first type of memory is a dynamic random access memory (DRAM) cache and the second type of memory is a storage class memory (SCM) cache.

11. The computer program product of claim 10, where a cache management application attempts to maintain the track in the DRAM cache for at least a first amount of time that equals the minimum retention time, and attempts to maintain the track in the SCM cache for no more than a second amount of time that equals the maximum retention time.

12. The computer program product of claim 10, wherein an insertion point of the track in a first least recently used (LRU) list of the SCM cache for the track is determined based on the maximum retention time that the track is allowed to be retained in the SCM cache, wherein different insertion points in the first LRU list of the SCM cache correspond to different amounts of time that a selected track of the first plurality of tracks is expected to be retained in the SCM cache.

13. The computer program product of claim 10, wherein the DRAM cache and the SCM cache form a two-tier cache with the DRAM cache being a higher tier and the SCM cache being a lower tier, and wherein tracks are promoted to the SCM cache from the DRAM cache in response to determining that a read access time exceeds a first predetermined threshold and a write access time is below a second predetermined threshold.

14. A system, comprising:
a memory; and
a processor coupled to the memory, wherein the processor performs operations, the operations performed by the processor comprising:
receiving from a host application for a first plurality of tracks, an indication of a minimum retention time and a maximum retention time in a cache comprising a first type of memory and a second type of memory, wherein the minimum retention time or the maximum retention time are not indicated for a second plurality of tracks; and
in response to accessing a track of the first plurality of tracks, setting for the track, the minimum retention time for the track to be stored in the first type of memory of the cache and the maximum retention time for the track to be stored in the second type of memory of the cache.

15. The system of claim 14, wherein the first type of memory has a lower latency and a lower storage capacity than the second type of memory.

16. The system claim 15, wherein the first type of memory is a dynamic random access memory (DRAM) cache and the second type of memory is a storage class memory (SCM) cache.

17. The system of claim 16, where a cache management application attempts to maintain the track in the DRAM cache for at least a first amount of time that equals the minimum retention time, and attempts to maintain the track in the SCM cache for no more than a second amount of time that equals the maximum retention time.

18. The system of claim 16, wherein an insertion point of the track in a first least recently used (LRU) list of the SCM cache for the track is determined based on the maximum retention time that the track is allowed to be retained in the SCM cache, wherein different insertion points in the first LRU list of the SCM cache correspond to different amounts of time that a selected track of the first plurality of tracks is expected to be retained in the SCM cache.

19. The system of claim 16, wherein the DRAM cache and the SCM cache form a two-tier cache with the DRAM cache being a higher tier and the SCM cache being a lower tier, and wherein tracks are promoted to the SCM cache from the DRAM cache in response to determining that a read access time exceeds a first predetermined threshold and a write access time is below a second predetermined threshold.

20. The system of claim 14, wherein tracks of the second plurality of tracks undergo a default mechanism for demotion from the cache.

\* \* \* \* \*